United States Patent Office 2,780,857
Patented Feb. 12, 1957

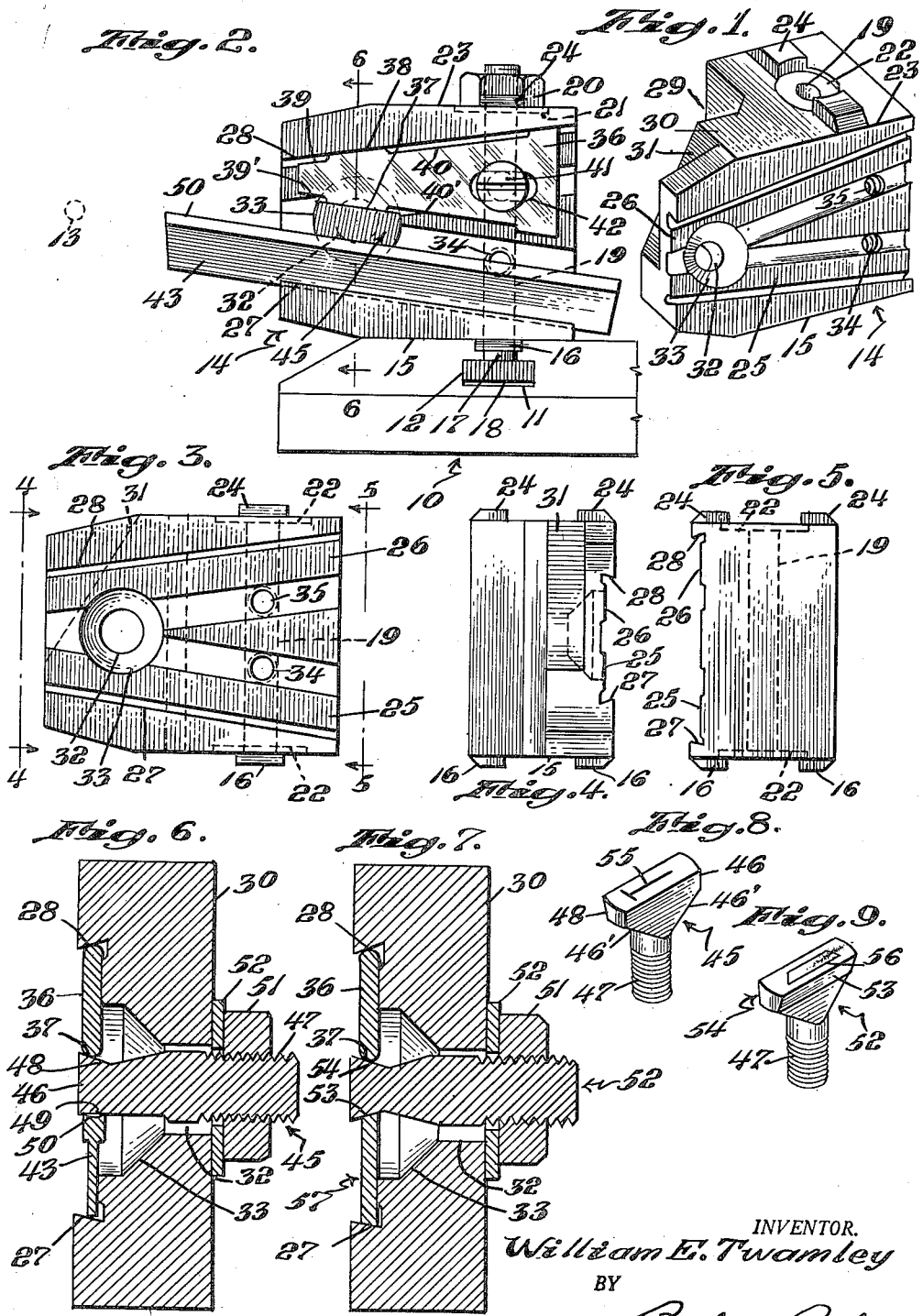

2,780,857
TOOL HOLDER

William E. Twamley, Providence, R. I., assignor to Brown & Sharpe Manufacturing Company, a corporation of Rhode Island Application March 15, 1954, Serial No. 416,277

5 Claims. (Cl. 29—96)

The present invention relates to improvements in tool holders, and more particularly to the tool holder illustrated and described in Letters No. 2,377,519, issued June 5, 1945, to Charles A. Rich.

The tool holder illustrated in the above patent is provided on one side thereof with a recess presenting converging clamping surfaces symmetrically arranged with respect to a horizontal axis to receive and support a cutting-off tool in either of two selected positions. The cutting-off tool is rigidly clamped in position by means of a wedge member slidably moved into clamping relation by a screw bolt which extends inwardly from the rear end portion of the block and axially of the recess. When the tool holder of this type is mounted on cross slides, particularly the rear slide, it is awkward to operate the screw bolt.

An object of this invention is to arrange the securing means for the clamping member at a more accessible location in the various positions in which the holder may be placed.

Another object is to provide for the clamping member to be readily interchangeable for different type cutting tools.

Another object is to provide the clamping member to be readily seated in parallelism on the cutting edge of the tool.

Another object is to provide for a clamping arrangement wherein the force applied by the clamping member on the cutting tool will be in a direction substantially widthwise of the tool.

With these and other objects in view, the invention consists of certain novel features of construction as will be more fully described and particularly pointed out in the appended claims.

In the accompanying drawings:

Figure 1 is a perspective view of a tool holder;

Figure 2 is an elevational view of the tool holder with a cutting-off tool held thereon and shown attached to the front cross slide of an automatic lathe or screw machine;

Figure 3 is an elevational view similar to Figure 2 of the holder by itself and attaching bolt omitted;

Figure 4 is an end view of the holder looking in the direction of the arrows on line 4—4 of Figure 3;

Figure 5 is a view of the other end of the holder looking in the direction of the arrows on line 5—5 of Figure 3;

Figure 6 is a sectional view shown on an enlarged scale taken substantially along line 6—6 of Figure 2;

Figure 7 is a similar view illustrating a different style cutting tool than that shown in Figure 6 and a modified clamp bolt for securing the same in position;

Figure 8 is a perspective view of the clamp bolt shown in Figure 6; and

Figure 9 is a perspective view of the clamp bolt shown in Figure 7.

The tool post or holder is made similar to the tool holder illustrated in the above-mentioned patent and is in all respects adapted to be used in the same manner by attachment to the front or rear cross slide in either upright or upside down positions. The cutting-off tool may be supported on the holder in either of two angular positions with respect to a horizontal axis. The improvements according to the invention are concerned with the arrangement for clamping the cutting-off tool in a manner to provide for positioning the clamping member at a location more readily accessible particularly when the holder is bolted to the rear cross slide of the machine. To this end the clamping member is made in the form of a bolt to extend at right angles to the tool supporting ways at a location forwardly on the holder so as to position the bolt nut at one side of the tool. The clamping bolt is received in a bore of a diameter much larger than the shank of the clamping bolt, which permits crosswise adjustment of the clamping bolt for variation in width of tools.

Referring to the drawing for a more detailed description, 10 designates generally one of the cross slides of an automatic lathe or screw machine and is provided with the usual inverted T slot 11 providing an undercut portion 12 on either side of the slot. The slide 10, which may be the front cross slide, is movable transversely toward and away from the axis of the machine spindle indicated by the broken line circle 13. The other or rear cross slide (not shown) is of substantially similar construction and is likewise movable transversely toward and away from the axis of the machine spindle 13.

In Figure 2 the tool holder designated generally 14 is illustrated mounted on the front slide 10 and comprises a solid block having a horizontal plane under side 15 adapted to rest flat on the upper surface of the cross slide 10. Aligned mounting lugs 16 are formed on the side 15 for locating the tool holder accurately with respect to the cross slide and engage in the upper portion of the T slot 11. The holder 14 is held rigidly in position on the cross slide by means of a bolt 17 having an enlarged head 18 which engages the undercut portions 12 of the slot and extends therefrom to pass through a bore 19 formed in the holder substantially midway between the lugs 16 (Figure 5). A clamping nut 20 screw threaded on the end of the bolt serves to secure the holder 14 rigidly in position on the cross slide 10. A washer 21 may be interposed between the nut 20 and the bottom of a counter bore portion 22 at the outer end of the bore 19. The upper side of the holder is also finished to provide a horizontal side portion 23 with locating lugs 24. When it is desired to mount the cutting-off tool on the rear side of the work on the rear cross slide (not shown), the tool holder 14 is turned to an upside down position so that the side 23 will lie flat on the upper surface of the rear cross slide and the lugs 24 will be positioned in the T slot of the rear slide. For this alternative position of the holder, the bolt must be reversed in the block 14 to secure the holder in position.

The holder 14 is provided on one side face thereof with a recess providing spaced supporting surfaces or ways 25, 26 on opposite sides of the axis of the recess to receive and support a cutting-off tool in either of two selected positions. The outer edge of the cutting-off tool when in the lower position is engaged with the undercut clamping surface 27 for rotation of the work in one direction and when the upper position is engaged with the undercut clamping surface 28 for rotation of the work in the other direction. These two surfaces 27, 28 converge toward the front end of the holder so that the cutting-off tool will be correctly located for cutting engagement with the work. The holder 14 so far described is substantially similar to the holder illustrated in the patent. In accordance with the present invention the tool holder is recessed as at 29 to form a forward nose portion 30 and further recessed as at 31 to provide a nose portion (see Figure 1). The nose portion has a bore 32 therethrough at the forward end thereof substantially midway between the surfaces or ways 25, 26. The bore 32 is enlarged inwardly from the front side face as by means of a tapered counter bore 33. The other end portion of the holder has two threaded bores 34, 35, similar to each other, which are equally spaced from the central axis of the recess of the tool holder.

A wedge plate 36 having converging side edges 37, 38 is adapted to be received and supported either on the ways 25, or on the ways 26 in either of these selected positions. The edge 38 for the upper position is engaged with the clamping surface 28 and for the lower position the edge 37 is engaged with the clamping surface 27. The said edges 37, 38 converge in the same direction as the clamping surfaces 27, 28 and are arranged to be in substantially parallel relation therewith respectively. The edge 38 may be recessed as at 39, 40 so as to provide spaced bearing surfaces and the edge 37 may be similarly recessed as as 39' and 40'. The wedge plate 36 is adjustably secured on the holder in the upper position thereof as shown in Figure 2 by means of a cap screw 41 threading in the bore 35 and passing through an elongated slot 42 in the wedge plate 36 that is located substantially on the central axis thereof. The forward portion of the wedge plate 36 extends across the bore 32 and may be made to overlay the said bore 32 to a greater or lesser degree by sliding the said wedge plate 36 along the surface 28. Thus, the distance of the spacing between the edge surface 37 and the clamping surface 27 may be varied.

A cutting-off tool designated 43 of the T type is shown in Figure 2 in the lower position supported against the clamping surface 27 and is rigidly secured in position by a clamp member designated generally 45 (see Figures 6 and 8). The clamp member 45 in the embodiment of the invention of Figures 6, 8 is in the form of a bolt having an enlarged head 46 and a threaded shank 47. The head 46 may be better described as being first made in circular shape with the sides 46' tapered to correspond with the taper of the counter bored portion 33. The head is made of a lesser diameter than the bore portion 33 so as to provide a loose fit therebetween. The head is reduced to a rectangular form as by removing material along parallel lines substantially equally spaced from the axis of the bolt. One side of the head 46 is undercut on a slant as at 48 to provide a clamping edge to engage with the edge 37 of the wedge plate 36. The opposite side 49 of the head extends parallel to the axis of the bolt to engage flat and in parallel relation against the cutting edge 50 of the cutting-off tool 43 so as not to mutilate the said edge 50 which is made slightly concave. The shank 47 is made of a diameter much less than the bore portion 32 to be loosely received therein so as to permit lateral shifting of the clamping member 45. The clamping member is drawn into the bore 32 and secured in position by a nut 51 screw threaded on the shank, a washer 52 being placed between the nut 51 and the holder. Thus, as the head is drawn towards the body of the tool holder, the cutting tool and wedge plate on its other side will be moved into rigid clamping relation with the clamping surfaces 27, 28.

In the other angular selected or up position of the cutting-off tool 43, the tool is turned upside down and the outer edge is engaged with the clamping surface 28. The edge 37 of the wedge plate is engaged with the clamping surface 27 and the cap screw is screw threaded in bore 34. The clamping member head 46 is axially turned to present the slanted undercut 48 against the edge 38 of the wedge plate and the flat surface against the cutting edge 50 of the tool.

The cutting-off tool clamping arrangement above described is adapted for securing the T type of cutting-off tool and may be readily adapted for use with the so-called "Johnson" cutting-off blade or tool designated 57 (see Figure 7) by interchanging clamping members. The clamping member designated 52 for the "Johnson" type tool is substantially similar to the clamping member 45 with the exception that both sides 53, 54 of the head are undercut at a similar bevel or taper of the cutting edge of the "Johnson" blade so as to engage the same flat across to prevent mutilation of said cutting edge when clamped in position.

In order to readily distinguish the clamping member 45 from the clamping member 52, each may have a distinguishing character engraved or otherwise displayed on the upper surface of the head. Thus, the member 45 may have a character 55 indicating a cross section of the T cutting-off tool and the member 52 may have a character 56 indicating the cross section of the "Johnson" blade.

It will now be apparent that among other features I have disclosed a tool holder wherein the clamping member is at a location between the cutting tool and an adjustable wedge-shaped spacer plate and wherein the clamping member may be secured in position from the side of the holder, allowing easy access to the nut when the tool holder is on either the rear or front cross slide.

I claim:

1. A tool holder for use on a lathe cross slide support comprising a block having spaced converging clamping surfaces between which and against one of which a cutting-off tool may be engaged, a wedge plate engaged with the other of said clamping surfaces, and a clamping member carried by said block to be movable to engage said tool and said wedge plate to secure said tool in position.

2. A tool holder for use on a lathe cross slide support comprising a block having spaced converging clamping surfaces between which and against one of which a cutting-off tool may be engaged, a wedge plate adjustably secured to said block and engaged with the other of said clamping surfaces, and a clamping member carried by said block at a position thereon between said wedge plate and said tool for engaging said wedge plate and said tool.

3. A tool holder for use on a lathe cross slide support comprising a block having spaced clamping surfaces between which and against one of which a cutting-off tool may be engaged, a wedge plate adjustably secured to said block and having converging side edges, one of said side edges engaging the other of said clamping surfaces, and a clamping member carried by said block at a position thereon between the other side edge of said wedge plate and said tool for engaging said wedge plate and said tool to secure said tool in position.

4. A tool holder for use in a lathe cross slide support comprising a block having spaced clamping surfaces between which and against one of which a cutting-off tool is engaged, a wedge plate adjustably secured to said block and having converging side edges one of which is engaged with the other of said clamping surfaces, and a clamp bolt carried by said block and having an enlarged head positioned between said wedge plate and said tool for engaging said wedge plate and said tool to secure said tool in position.

5. A tool holder for use on a lathe cross slide support comprising a block having a recess providing spaced clamping surfaces between which and against one of which a cutting-off tool is engaged, a wedge plate adjustably secured to said block and having converging side edges one of which is engaged with the other of said clamping surfaces, said block having a bore extending therethrough substantially at right angles to said clamping surfaces and midway therebetween, a clamp bolt received in said bore and having an enlarged head positioned between said wedge plate and said tool, said head engaging said tool and said wedge plate to secure said tool against one of said clamping surfaces.

References Cited in the file of this patent

UNITED STATES PATENTS

| | | |
|---|---|---|
| 943,087 | Liden | Dec. 14, 1909 |
| 1,440,187 | Sury | Dec. 26, 1922 |
| 2,188,917 | Poorman | Feb. 6, 1940 |
| 2,377,519 | Rich | June 5, 1945 |
| 2,398,913 | Anthony | Apr. 23, 1946 |

FOREIGN PATENTS

| | | |
|---|---|---|
| 10,821 | France | Oct. 8, 1909 |
| 578,388 | Great Britain | June 26, 1946 |